United States Patent
Shepherd et al.

(10) Patent No.: US 11,634,020 B2
(45) Date of Patent: Apr. 25, 2023

(54) ELECTRIFIED VEHICLE BATTERY PACKS WITH TEAR-AWAY SERVICE PANELS

(71) Applicant: FORD GLOBAL TECHNOLOGIES, LLC, Dearborn, MI (US)

(72) Inventors: Barry Shepherd, Southfield, MI (US); Patrick Daniel Maguire, Ann Arbor, MI (US); Thomas Edward Smith, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/462,341

(22) Filed: Aug. 31, 2021

(65) Prior Publication Data

US 2021/0399375 A1    Dec. 23, 2021

Related U.S. Application Data

(62) Division of application No. 16/039,729, filed on Jul. 19, 2018, now Pat. No. 11,133,550.

(51) Int. Cl.
| | |
|---|---|
| *B60K 1/04* | (2019.01) |
| *H01M 10/0565* | (2010.01) |
| *H01M 10/42* | (2006.01) |
| *H01M 50/276* | (2021.01) |
| *H01M 50/224* | (2021.01) |
| *H01M 50/209* | (2021.01) |

(52) U.S. Cl.
CPC ........... *B60K 1/04* (2013.01); *H01M 10/0565* (2013.01); *H01M 10/42* (2013.01); *H01M 50/209* (2021.01); *H01M 50/224* (2021.01); *H01M 50/276* (2021.01)

(58) Field of Classification Search
CPC .. H01M 50/20; H01M 50/204; H01M 50/278; H01M 10/42
See application file for complete search history.

(56) References Cited

U.S. PATENT DOCUMENTS

| | | | |
|---|---|---|---|
| 4,474,304 A | 10/1984 | Jacobs | |
| 6,696,196 B1 | 2/2004 | Eilers | |
| 9,246,148 B2 * | 1/2016 | Maguire | ............. H01M 50/342 |
| 2001/0046622 A1 | 11/2001 | Barwick | |
| 2004/0251872 A1 | 12/2004 | Wang et al. | |
| 2007/0022682 A1 | 2/2007 | Morgenegg et al. | |
| 2010/0129702 A1 | 5/2010 | Milner | |
| 2012/0103714 A1 | 5/2012 | Choi et al. | |
| 2018/0170209 A1 | 6/2018 | Maguire et al. | |

FOREIGN PATENT DOCUMENTS

| | | | |
|---|---|---|---|
| GB | 2517514 | * | 2/2015 |
| WO | WO 2012-024354 | * | 2/2012 |

* cited by examiner

*Primary Examiner* — Brittany L Raymond
(74) *Attorney, Agent, or Firm* — David B. Kelley; Carlson, Gaskey & Olds, P.C.

(57) ABSTRACT

Exemplary battery pack designs for use in electrified vehicles may include an enclosure assembly that houses one or more battery internal components (e.g., battery arrays, battery electronic components, or both). A tear-away service panel may be positioned within a wall of the enclosure assembly. The service panel may be removed from the enclosure assembly to access one of the battery internal components requiring service and may be subsequently replaced with a replacement service panel. The replacement service panel may be part of a battery pack resealing kit.

18 Claims, 7 Drawing Sheets

ELECTRIFIED VEHICLE BATTERY PACKS WITH TEAR-AWAY SERVICE PANELS

CROSS REFERENCE TO RELATED APPLICATIONS

This is a divisional of U.S. patent application Ser. No. 16/039,729, filed on Jul. 19, 2018, the entire disclosure of which is incorporated herein by reference.

TECHNICAL FIELD

This disclosure relates to electrified vehicle battery packs, and more particularly to battery packs that include tear-away service panels for accessing battery internal components that require service.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery internal components including, but not limited to, battery arrays and battery electronic components. It may become necessary to open the enclosure assembly if one or more of the battery internal components require service.

SUMMARY

A battery pack according to an exemplary aspect of the present disclosure includes, among other things, an enclosure assembly, a tear-away service panel positioned within a wall of the enclosure assembly, and a bracket circumscribing the tear-away service panel.

In a further non-limiting embodiment of the foregoing battery pack, the enclosure assembly is a polymer-based component.

In a further non-limiting embodiment of either of the foregoing battery packs, the enclosure assembly includes a tray and a cover.

In a further non-limiting embodiment of any of the foregoing battery packs, a battery internal component is housed within an interior of the enclosure assembly.

In a further non-limiting embodiment of any of the foregoing battery packs, the battery internal component includes a battery array, a battery electronic component, or both.

In a further non-limiting embodiment of any of the foregoing battery packs, the enclosure assembly is constructed of a first polymer-based material and the bracket is constructed of a second polymer-based material that is different from the first polymer-based material.

In a further non-limiting embodiment of any of the foregoing battery packs, the tear-away service panel includes a ductile portion that is removable from the wall to expose an access opening.

In a further non-limiting embodiment of any of the foregoing battery packs, the ductile portion includes a tear strip.

In a further non-limiting embodiment of any of the foregoing battery packs, the tear strip is established by a first groove and a second groove formed in the wall.

In a further non-limiting embodiment of any of the foregoing battery packs, a pull tab is connected to the tear strip.

In a further non-limiting embodiment of any of the foregoing battery packs, the ductile portion includes a groove and a panel body bounded by the groove.

In a further non-limiting embodiment of any of the foregoing battery packs, a pull tab is connected to the panel body.

In a further non-limiting embodiment of any of the foregoing battery packs, the bracket includes a groove formed in an outer surface.

In a further non-limiting embodiment of any of the foregoing battery packs, the bracket includes a plurality of retention features that protrude laterally outwardly from an outer surface of the bracket.

In a further non-limiting embodiment of any of the foregoing battery packs, the bracket is configured to accept a replacement service panel after removal of the tear-away service panel.

A battery pack resealing kit according to another exemplary aspect of the present disclosure includes, among other things, a replacement service panel for covering an access opening formed in an enclosure assembly of a battery pack, a surface preparation aid for preparing a surface of the enclosure assembly for receiving the replacement service panel, and an adhesive for affixing the replacement service panel to the surface.

In a further non-limiting embodiment of the foregoing battery pack resealing kit, the replacement service panel includes a groove that establishes a receptacle for receiving the adhesive.

In a further non-limiting embodiment of either of the foregoing battery pack resealing kits, the replacement service panel includes a first retention feature configured to engage a second retention feature of a bracket of the enclosure assembly.

In a further non-limiting embodiment of any of the foregoing battery pack resealing kits, the surface preparation aid is an abrasive cloth or pad.

In a further non-limiting embodiment of any of the foregoing battery pack resealing kits, the adhesive is a silicone based adhesive or a non-silicone based adhesive.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs include an enclosure assembly that houses one or more battery internal components (e.g., battery arrays, battery electronic components, or both). A tear-away service panel may be positioned within a wall of the enclosure assembly. The service panel may be removed from the enclosure assembly to access one of the battery internal components requiring service and may be subsequently replaced with a replacement service panel. The replacement service panel may be part of a battery pack resealing kit. These and other features are discussed in greater detail in the following paragraphs of this detailed description.

Figure 1:
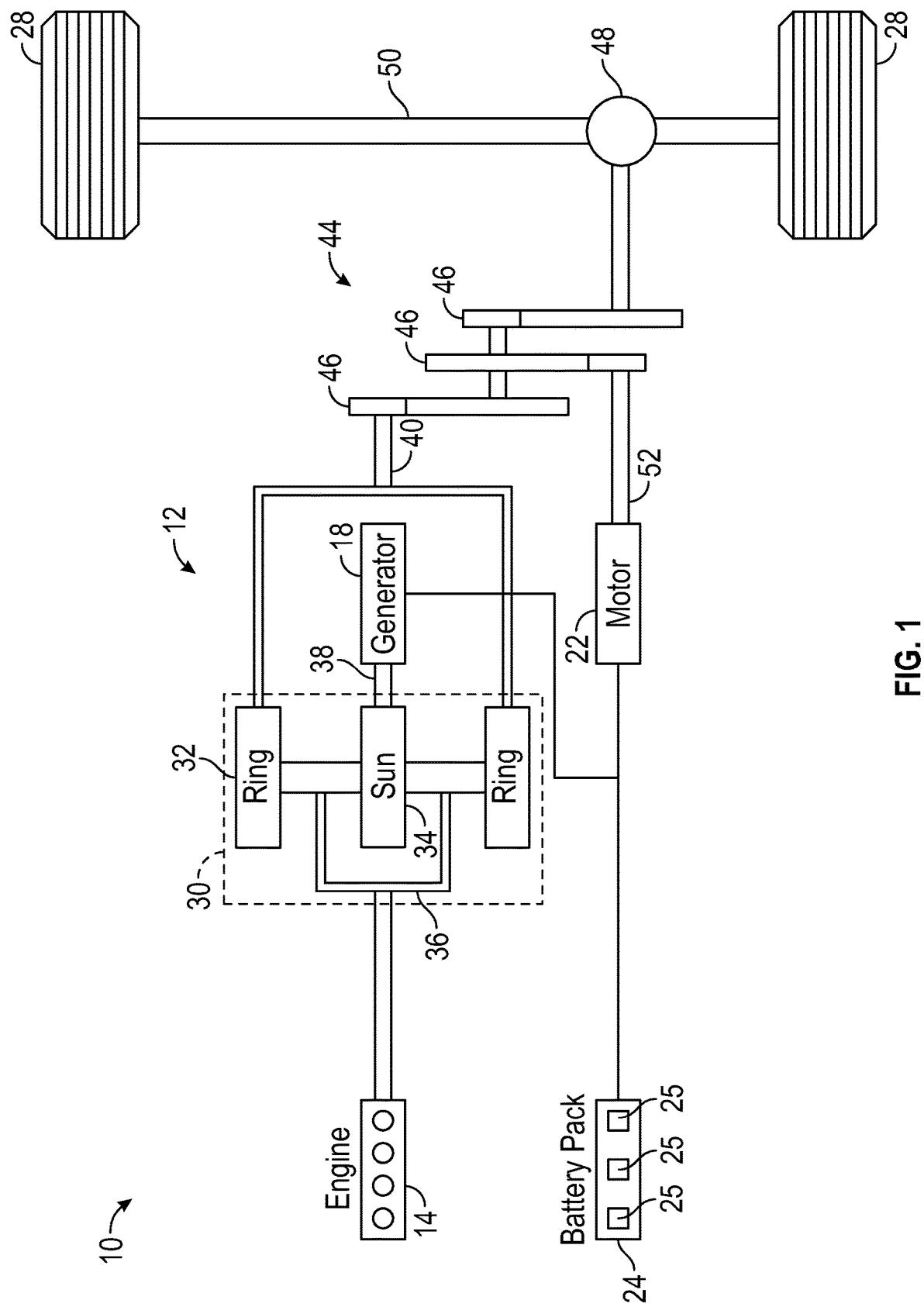
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
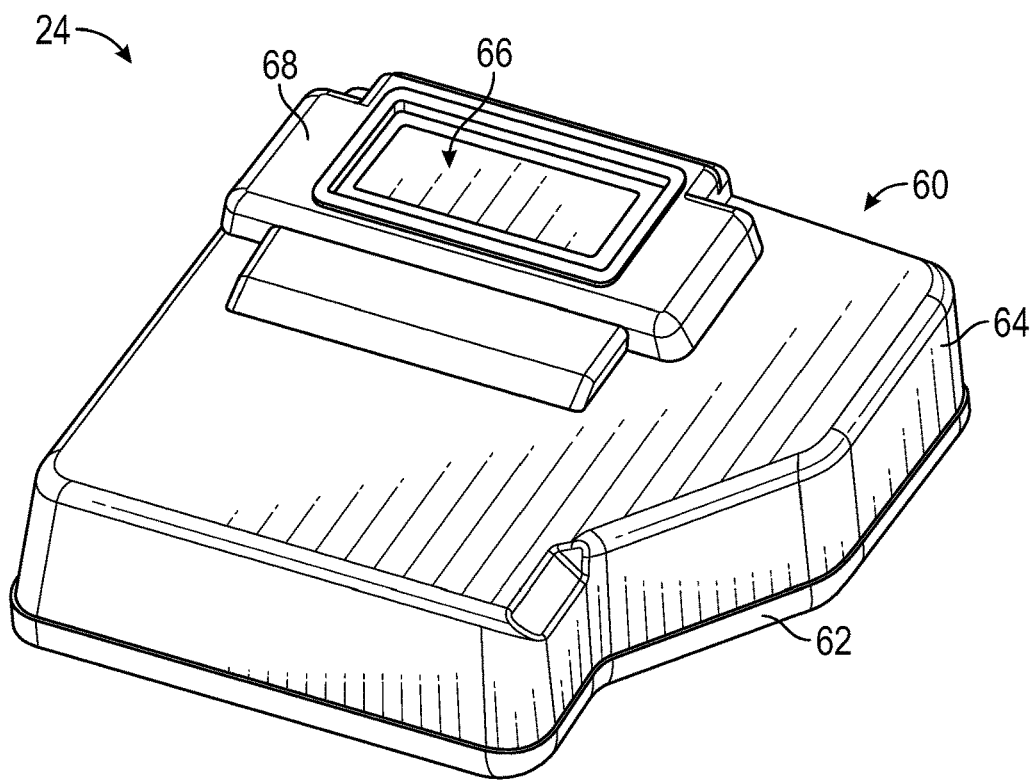
FIG. 2 illustrates a battery pack of an electrified vehicle.
Figure 3:
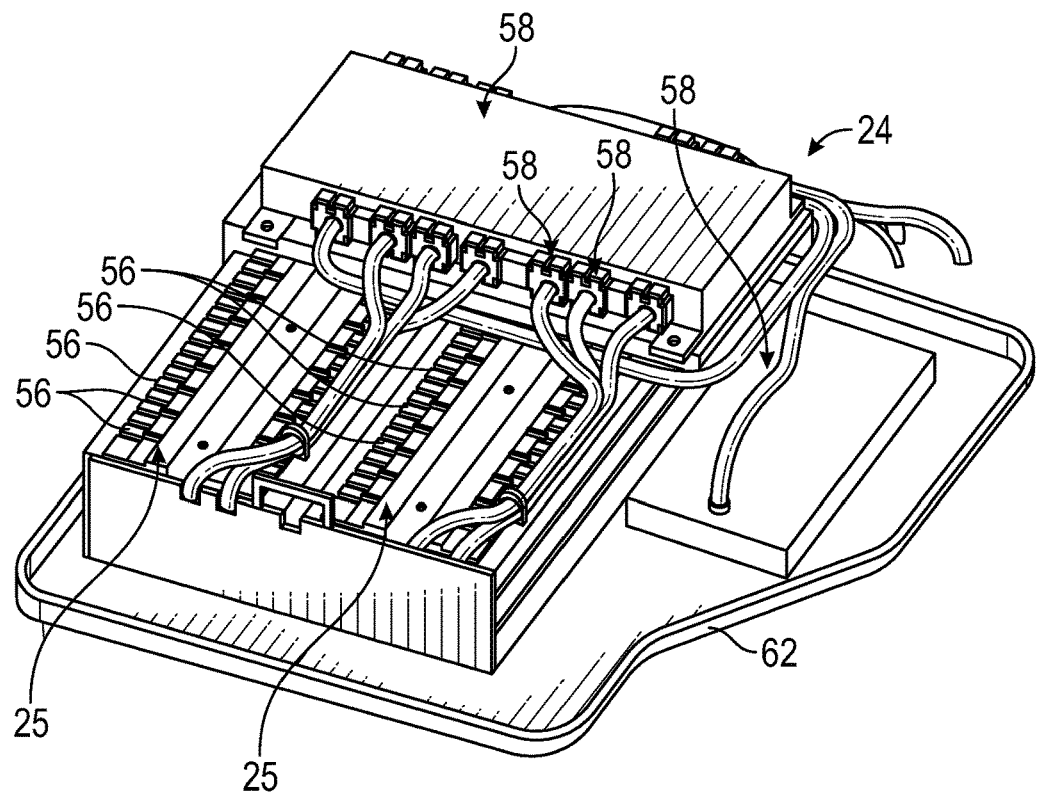
FIG. 3 illustrates the battery pack of FIG. 2 with portions removed for illustrating the internal contents of the battery pack.

FIGS. 2 and 3 illustrate a battery pack 24 that can be employed within an electrified vehicle, such as the electrified vehicle 12 of FIG. 1. FIG. 2 is a perspective view of the battery pack 24, and FIG. 3 illustrates the battery pack 24 with select portions removed for visualizing the internal contents of the battery pack 24.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIG. 3.

The battery cells 56 may be stacked side-by-side along one or more stack axes to construct groupings of battery cells 56, sometimes referred to as a "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery cells 56 of each grouping, along with any support structures (e.g., array frames, spacers, rails, walls, plates, bindings, etc.), may collectively be referred to as a battery assembly or a battery array 25. The battery pack 24 depicted in FIGS. 2-3 includes two laterally adjacent battery arrays 25; however, the battery pack 24 could include a greater or fewer number of battery arrays and still fall within the scope of this disclosure.

The battery pack 24 may additionally house one or more battery electronic components 58. The battery electronic component 58 could include a bussed electrical center (BEC), a battery electric control module (BECM), wiring harnesses, wiring loops, I/O connectors, etc., or any combination of these battery electronic components.

An enclosure assembly 60 may house each battery array 25 and each battery electronic component 58 of the battery pack 24. Since the battery array 25 and the battery electronic components 58 are housed inside the enclosure assembly 60, these components may be referred to as battery internal components of the battery pack 24. The enclosure assembly 60 may include a tray 62 and a cover 64. The enclosure assembly 60 may include any size, shape, and configuration within the scope of this disclosure. The cover 64 of the enclosure assembly 60 has been removed in FIG. 3 to better illustrate the battery internal components.

In an embodiment, the enclosure assembly 60 is a polymer-based component. For example, the tray 62 and the cover 64 could be constructed (e.g., molded) of one or more polymer-based materials. Exemplary polymer-based materials can include, but are not limited to, high density polyethylene, expanded polypropylene, expanded polystyrene, expanded polyethylene, sheet moulding compounds (e.g., glass-fiber reinforced polyester), polypropylene, and polyamine In yet another embodiment, the enclosure assembly 60 includes metallic-based components. For example, portions of the tray 62 and the cover 64 could be constructed out of aluminum or steel in combination with polymer-based materials.

In another embodiment, the enclosure assembly 60 is a sealed enclosure. For example, during assembly, the battery internal components may be positioned on the tray 62, and the cover 64 may then be fixedly secured to the tray 62 to seal the battery internal components therein. In an embodiment, the cover 64 is thermally welded to the tray 62, thus creating a permanent seal without using any separate gaskets or mechanical fasteners.

One or more of the battery internal components may require servicing (e.g., repair or replacement) during the life of the battery pack 24. Therefore, a service panel 66 (see FIG. 2) may be positioned within a wall 68 of the enclosure assembly 60 to provide selective access to the battery internal components. The wall 68 could be part of either the tray 62 or the cover 64 of the enclosure assembly 60. In an embodiment, the service panel 66 is molded into the wall 68 and thus is an integral portion of the enclosure assembly 60.

The service panel 66 may be removed (e.g., torn away) from the wall 68 for accessing and servicing one or more of the battery internal components without requiring the complete disassembly of the enclosure assembly 60. Once removed, the service panel 66 can be discarded and replaced with a replacement service panel, as discussed in greater detail below.

Figure 4A:
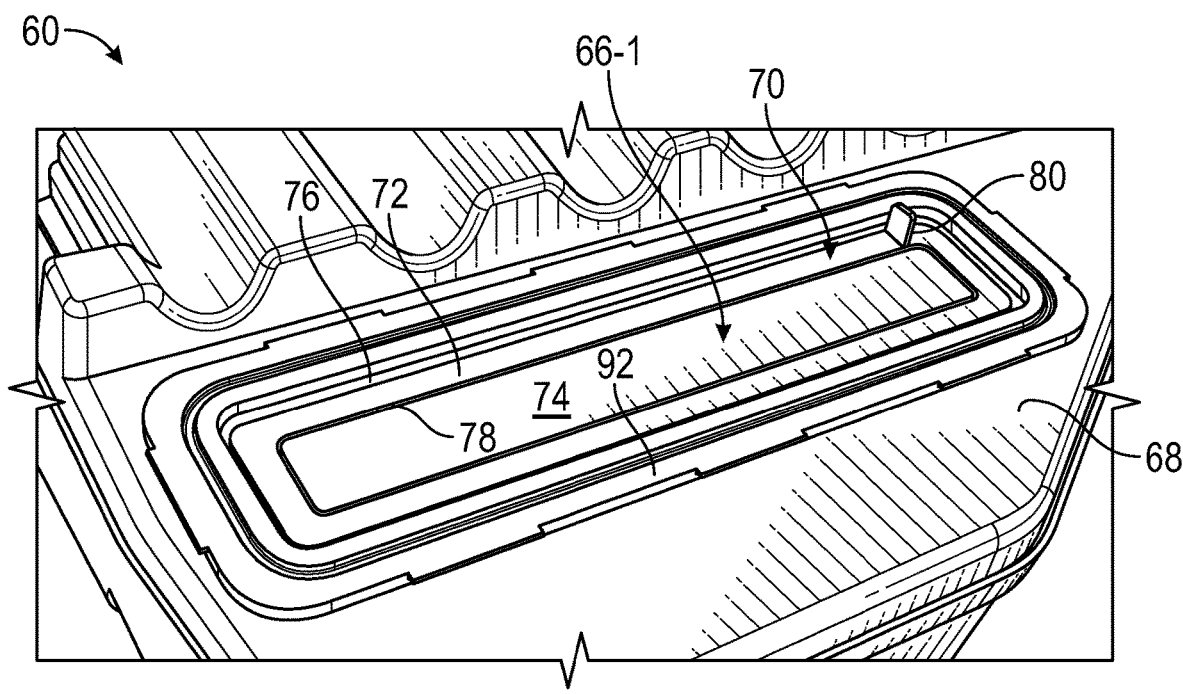
FIGS. 4A and 4B illustrate a battery pack service panel according to a first embodiment of this disclosure.
Figure 4B:
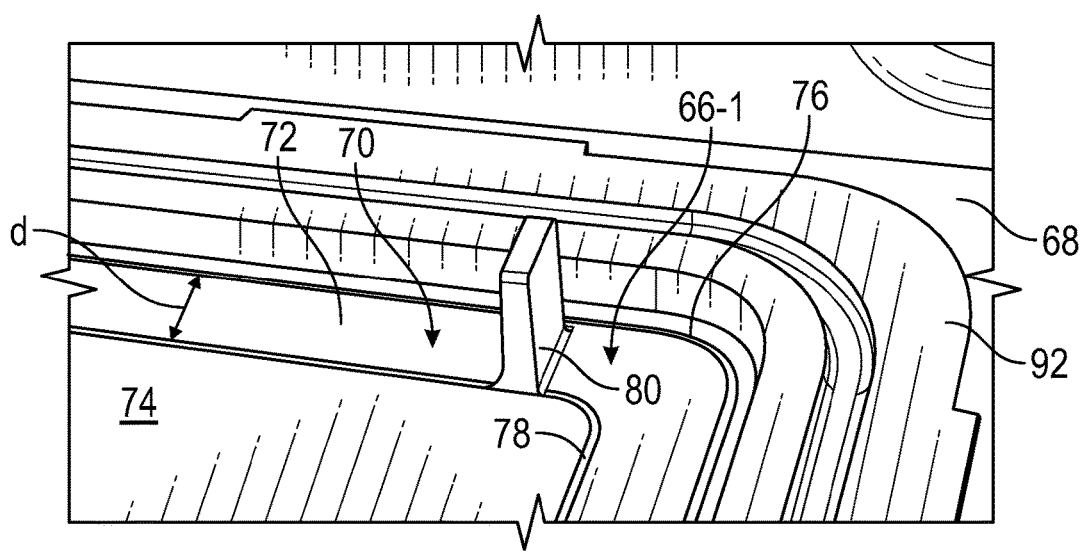

FIGS. 4A and 4B illustrate a first exemplary service panel 66-1. The service panel 66-1 may include a ductile portion 70 that includes a tear strip 72 and a center body 74 bounded by the tear strip 72. The tear strip 72 may be established by a first groove 76 and a second groove 78 (i.e., a double groove design) that are molded into the wall 68 of the enclosure assembly 60. The ductile portion 70 can be plastically deformed, such as by pulling the tear strip 72, to expose the battery internal components housed inside the enclosure assembly 60. The ductile portion 70 is therefore understood to be irreversibly removable from the enclosure assembly 60.

The first groove 76 and the second grooves 78 may be concentric grooves that extend parallel to one another along an outer surface of the wall 68. Although shown embodying a rectangular shape, the grooves 76, 78 and the center body 74 could take the form of other shapes, such as circular, square, or irregular shapes, for example. The grooves 76, 78 may be spaced apart by a distance d (see FIG. 4B). In an embodiment, the distance d is approximately 6 to 10 millimeters (0.24-0.39 inches), although other distances are also contemplated within the scope of this disclosure. The tear strip 72 is the piece of material that extends across the distance d between the first groove 76 and the second groove 78 to connect the center body 74 to the wall 68 of the enclosure assembly 60.

The tear strip 72 may include a pull tab 80 that is connected to a portion of the tear strip 72. The pull tab 80 may be pulled to exceed the strain capability of the ductile portion 70 of the service panel 66-1 and thereby begin severing the tear strip 72 from the wall 68. The tear strip 72 may be pulled between the two grooves 76, 78 to release the center body 74 from its attachment to the wall 68. The tear strip 72 may be pulled completely around a perimeter of the center body 74 until arriving back to its origin (i.e., the original location of the pull tab 80). The center body 74 may then be removed to expose the battery internal components. In an embodiment, either the first groove 76 or the second groove 78 may be an incomplete loop, ending just short of the pull tab 80, such that the center body 74 remains connected to the tear strip 72 and both the tear strip 72 and the center body 74 can be removed from the wall 68 as one piece.

Figure 5A:
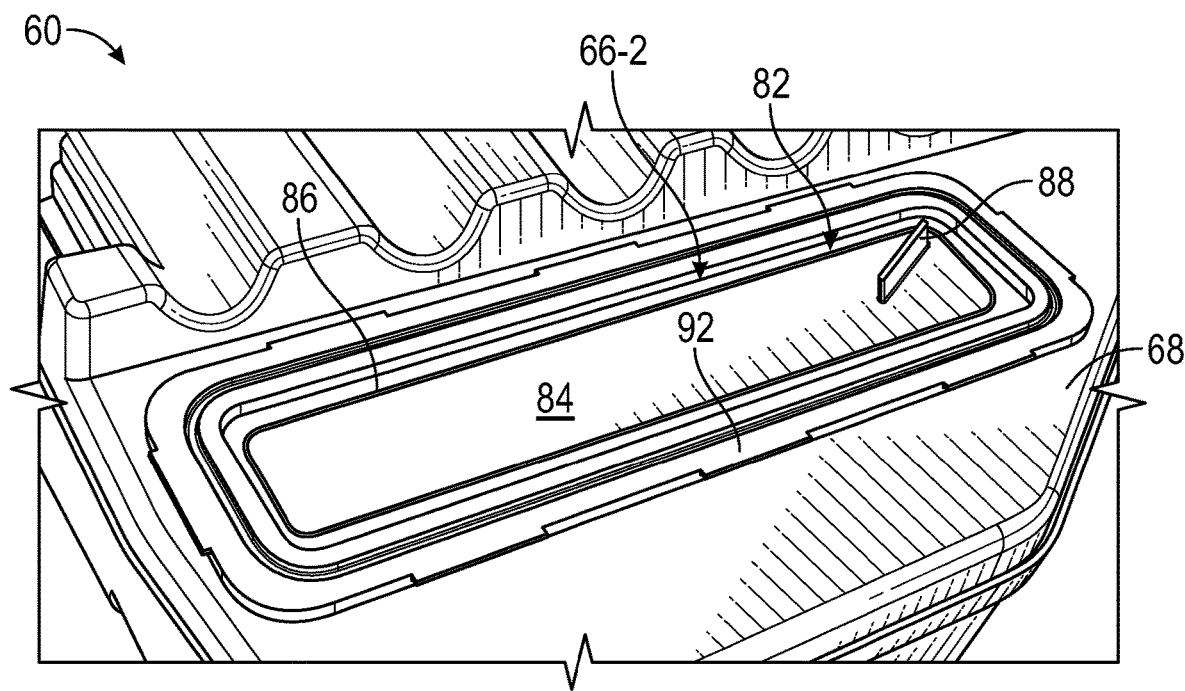
FIGS. 5A and 5B illustrate a battery pack service panel according to a second embodiment of this disclosure.
Figure 5B:
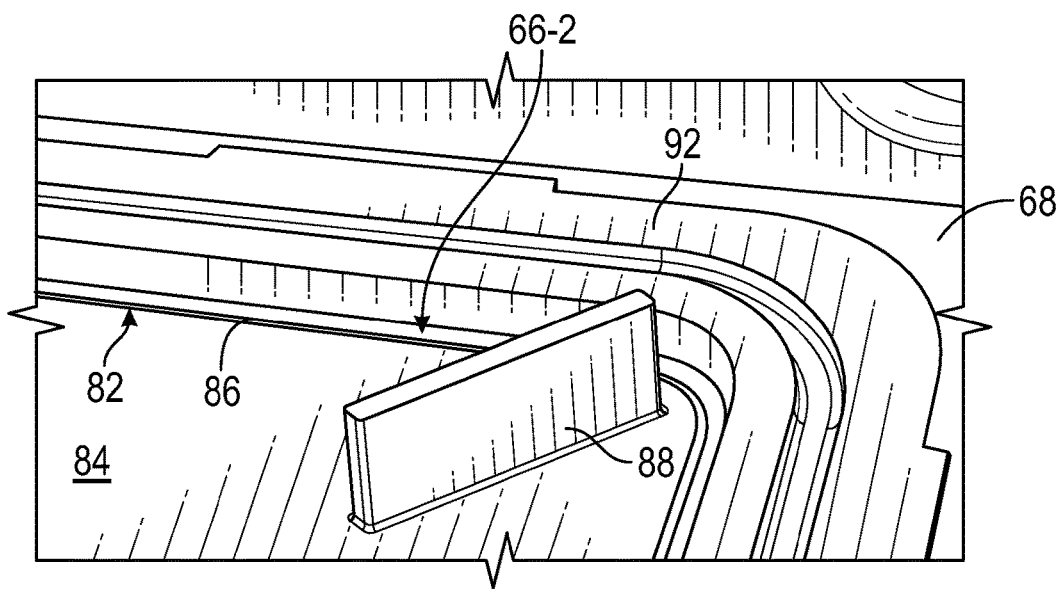

FIGS. 5A and 5B illustrate a second exemplary service panel 66-2. The service panel 66-2 may include a ductile portion 82 that is defined about an outer periphery of a panel body 84. The ductile portion 82 may include a groove 86 (i.e., a single groove design) that frangibly connects the panel body 84 to the wall 68. The groove 86 may be perforated in order to weaken the outer periphery such that the panel body 84 can be selectively removed from the wall 68 of the enclosure assembly 60. In other words, the panel body 84 can be torn away from the wall 68 by plastically deforming the ductile portion 82 along the groove 86.

The service panel 66-2 may include a pull tab 88 that is connected to the panel body 84. The pull tab 88 may be pulled to exceed the strain capability of the ductile portion 82 of the service panel 66-2 and thereby begin severing the panel body 84 from the wall 68.

Figure 6:
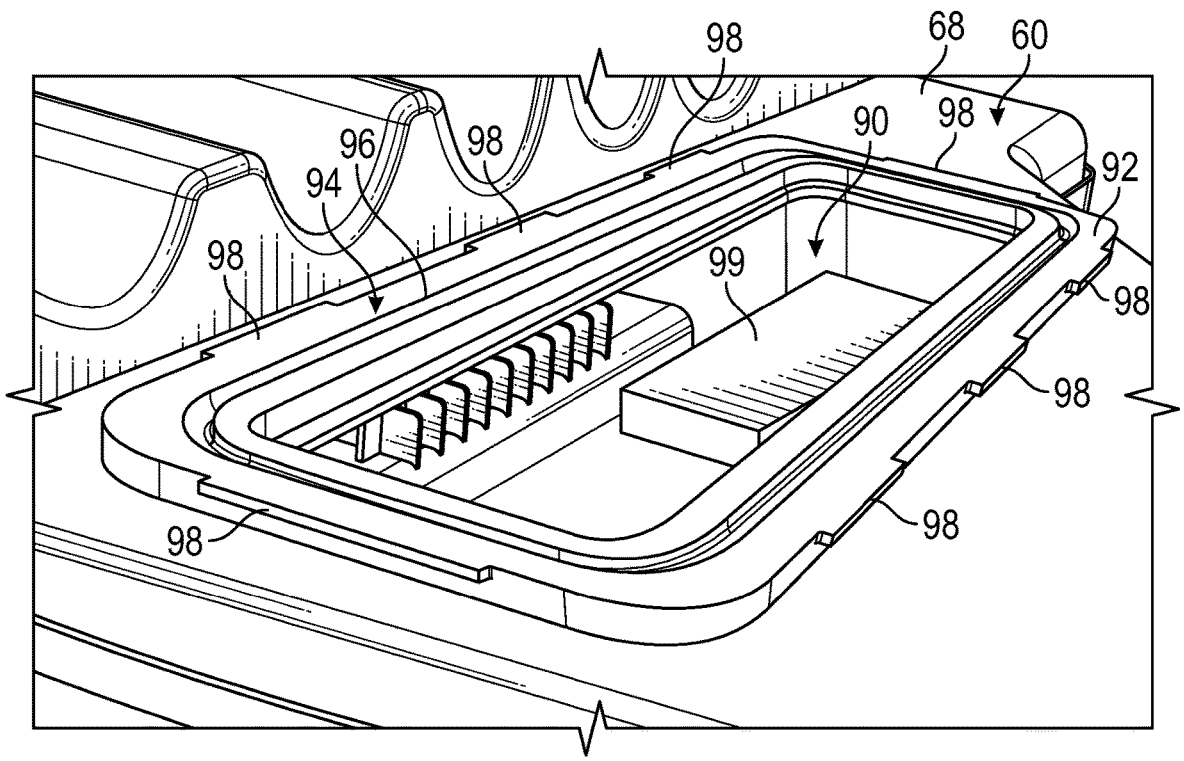
FIG. 6 illustrates a bracket of a battery pack after removing a service panel.

FIG. 6 illustrates the wall 68 of the enclosure assembly 60 after removing the service panel 66. Hereinafter, reference numeral 66 is intended to denote the service panel 66-1, the service panel 66-2, or any other tear-away service panel. Removal of the service panel 66 exposes an access opening 90 in the wall 68. The access opening 90 provides access to an interior of the enclosure assembly 60, within which a serviceable battery internal component 99 may be housed.

A bracket 92 may circumscribe the access opening 90, and therefore, the bracket 92 may circumscribe the service panel 66 prior to its removal (see, e.g., FIGS. 2 and 4A-5B). The bracket 92 may be inserted molded into the wall 68 to provide a surface for receiving a replacement service panel for resealing the access opening 90 after servicing the battery internal component 99.

The bracket 92 may be made from a different polymer-based material than the wall 68 of the enclosure assembly 60. In an embodiment, the bracket 92 is made of a polyamide (e.g., nylon, PA-66, etc.). However, other polymer-based materials are also contemplated within the scope of this disclosure.

An outer surface 94 of the bracket 92 may include a groove 96. The groove 96 provides a receptacle for receiving an adhesive for securing a replacement service panel to the bracket 92, as discussed further below. In an embodiment, the groove 96 extends about an entirety of the bracket 92 such that the groove 96 also circumscribes the access opening 90.

The bracket 92 may additionally include a plurality of retention features 98 configured for receiving corresponding retention features of a replacement service panel. The retention features 98 may include flanges, clips, or both. The retention features 98 may protrude laterally outwardly from an outer perimeter of the outer surface 94 of the bracket 92.

Figure 7:
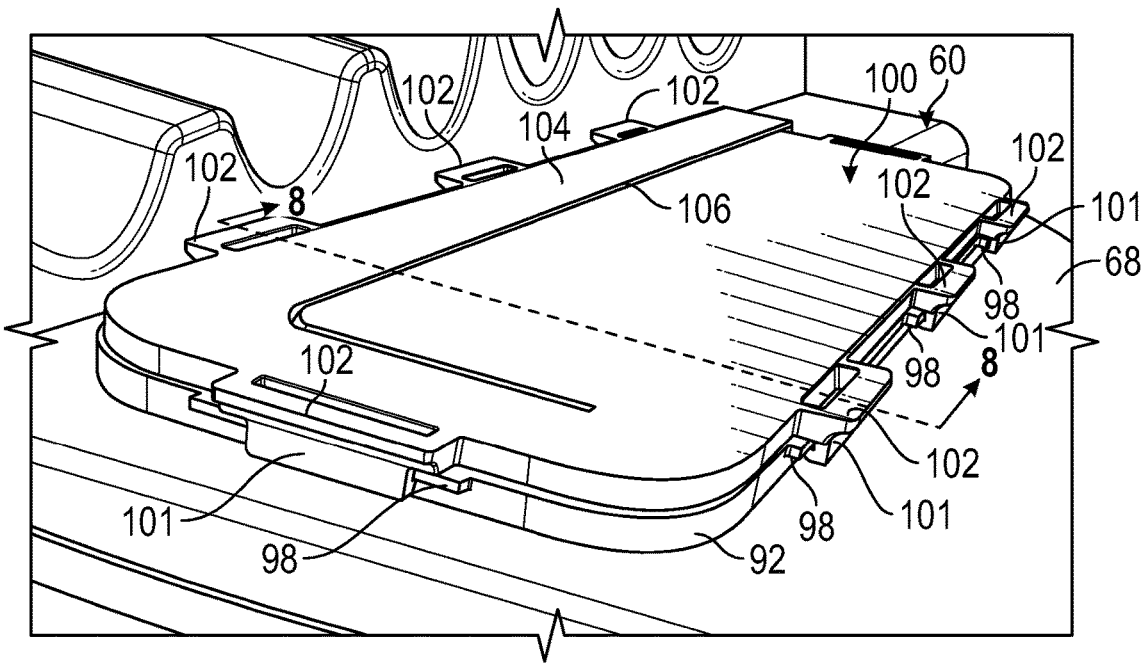
FIG. 7 illustrates a replacement panel secured to a battery pack after removing a service panel.
Figure 8:
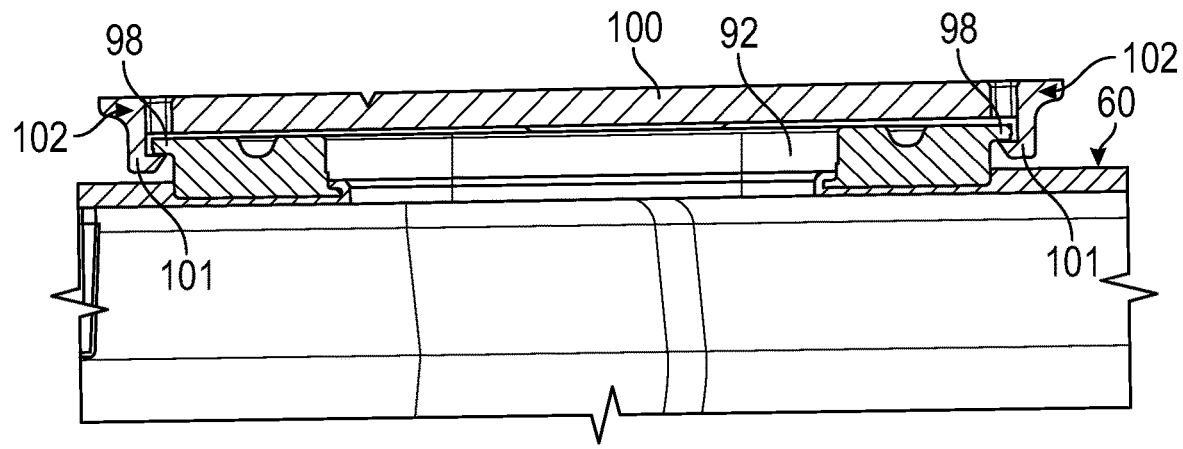
FIG. 8 illustrates a cross-sectional view through section 8-8 of FIG. 7.

FIGS. 7-8, with continued reference to FIG. 6, illustrate a replacement service panel 100 for resealing the enclosure assembly 60, such as after the servicing tasks have been performed on the battery internal component 99. The replacement service panel 100 may be secured to the bracket 92 to close-off the access opening 90. In an embodiment, the replacement service panel 100 is made from the same polymer-based material as the bracket 92.

The replacement service panel 100 may include retention features 102 that are configured to engage the retention features 98 of the bracket 92. In the illustrated embodiment, the retention features 102 of the replacement service panel 100 include flexible clips 101 that clip onto the retention features 98 (e.g., flanges) of the bracket 92. Of course an opposite configuration is also contemplated in which the bracket 92 includes the flexible clips and the replacement service panel 100 includes the flanges.

Figure 9:
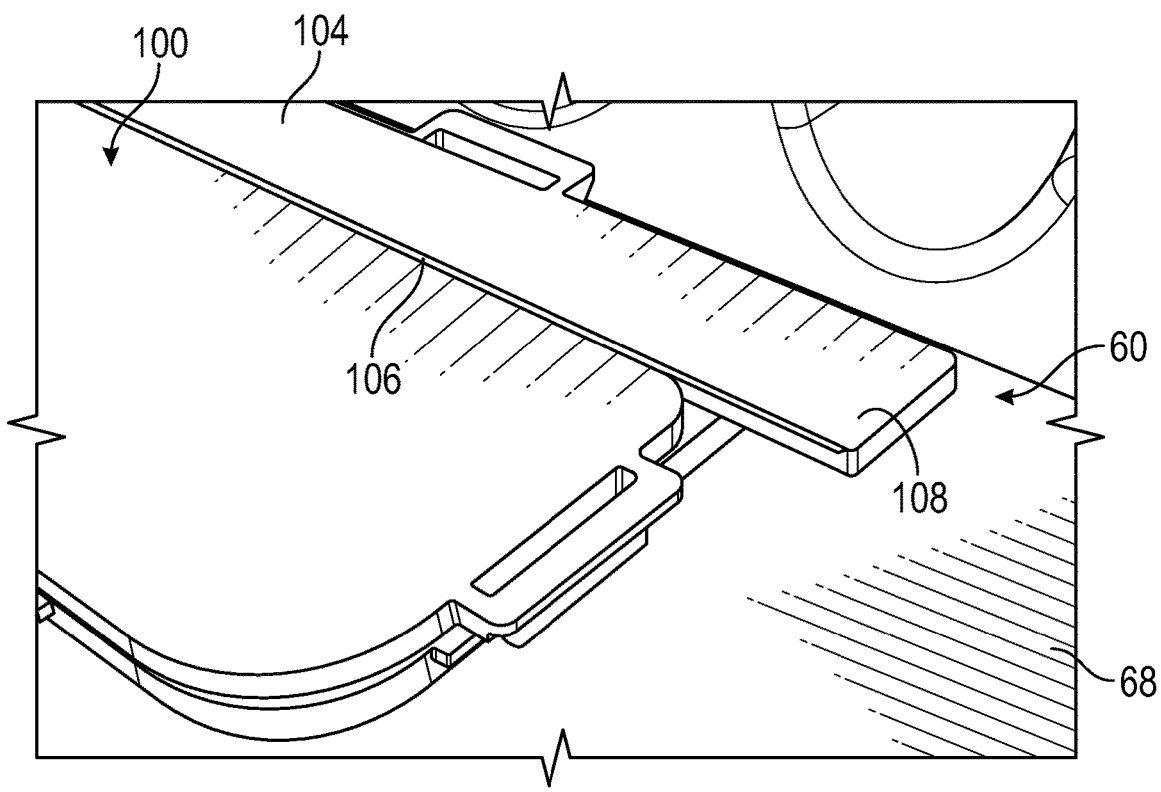
FIG. 9 illustrates a pull tab of the replacement panel of FIG. 7.

In some cases, it may be desirable to service the battery pack 24 a second time. Referring now to FIGS. 7 and 9, the replacement service panel 100 may thus include a tear strip 104 that can be torn along a groove 106 to remove the replacement service panel 100 from the enclosure assembly 60. The groove 106 may be L-shaped or U-shaped, in some embodiments. The tear strip 104 may include a tongue 108 (see FIG. 9) that can be pulled to exceed the strain capability of the groove 106 for severing the replacement service panel 100 from the bracket 92. After performing any necessary servicing tasks, the replacement service panel 100 can be replaced with yet another replacement service panel.

Figure 10:
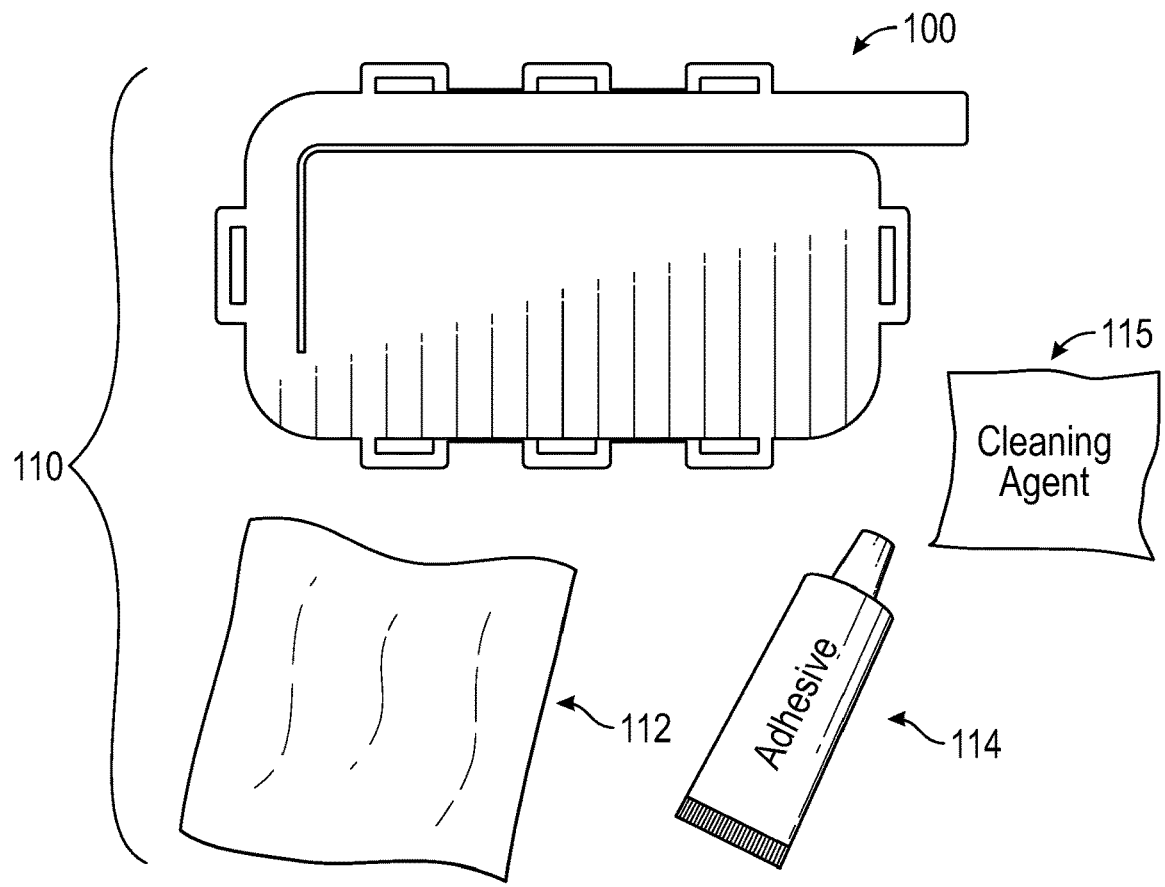
FIG. 10 illustrates a battery pack resealing kit for resealing the battery pack after removing a service panel.

FIG. 10, with continued reference to FIGS. 1-9, schematically illustrates a battery pack resealing kit 110 for resealing the battery pack 24 after removing the tear-away service panel 66. The battery pack resealing kit 110 may include the replacement service panel 100, a surface preparation aide 112, and an adhesive 114.

The surface preparation aide 112 may be used to prepare the bracket 92 for receiving the replacement service panel 100. In an embodiment, the surface preparation aide 112 is an abrasive pad or cloth configured for scuffing surfaces of the bracket 92 in order to better prepare the surfaces for bonding with the replacement service panel 100.

In another embodiment, the battery pack resealing kit 110 may optionally include a cleaning agent 115 for cleaning the bracket 92 prior to and/or after preparing the bracket 92 with the surface preparation aide 112. The cleaning agent 115 may be an alcohol wipe or any other suitable cleaning agent.

The adhesive 114 is configured to structurally hold the replacement service panel 100 to the enclosure assembly 60 while providing a water-tight seal. The adhesive 114 may be a silicone based adhesive, a non-silicone based adhesive, or any other suitable adhesive.

Figure 11:
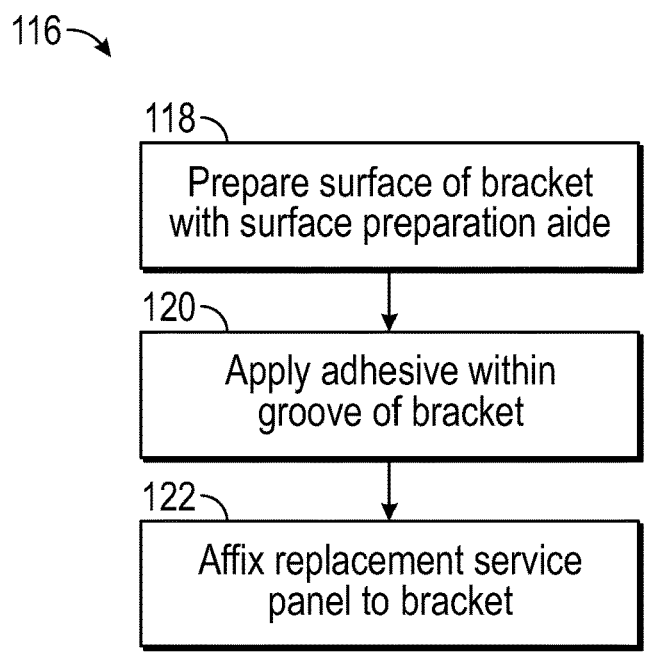
FIG. 11 schematically illustrates a battery pack resealing method.

FIG. 11, with continued reference to FIGS. 1-10, schematically illustrates a battery pack resealing method 116. The method 116 may be performed using the battery pack resealing kit 110 by a service technician (i.e., a mechanic) in conjunction with a service procedure in which the tear-away service panel 66 has been removed from the battery pack 24.

The method 116 may include the following steps. First, as shown at block 118, a surface of the bracket 92, such as the outer surface 94, is prepared using the surface preparation aide 112. For example, the surface preparation aide 112 may be used to scuff the outer surface 94 of the bracket 92 in order to better prepare the bracket 92 for bonding with the adhesive 114. The bracket 92 may optionally be cleaned using the cleaning agent 115, such as an alcohol wipe, prior to and/or after preparing the bracket 92 with the surface preparation aide.

Next, as shown at block 120, a bead of adhesive 114 may be applied within the groove of 96 of the bracket 92. Finally, at block 122, the replacement service panel 100 may be affixed to the bracket 92 to seal the access opening 90. The retention features 102 of the replacement service panel 100 may engage the retention features 98 of the bracket 92 to hold the replacement service panel 100 in place while the adhesive 114 cures.

The exemplary battery packs of this disclosure incorporate tear-away service panels for accessing serviceable battery internal components that are housed inside the battery packs. The tear away service panels enable the use of polymer based battery pack enclosures. The polymer-based enclosures may be provided a solid piece sealed structure that does not require any separate gaskets, sealants, or fasteners. The proposed designs of this disclosure thereby reducing weight, costs, and assembly times associated with existing battery pack designs.

This disclosure is not necessarily limited to electric vehicle battery pack enclosure assemblies. Other electric vehicle components may benefit from the service panels described above, including but not limited to, motor inverter/converter systems. In addition, the teachings of this disclosure may be applicable to non-automotive components including any component in which it is desirable to provide access to a serviceable part housed inside the component.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack resealing kit, comprising:
a replacement service panel for covering an access opening formed in an enclosure assembly of a battery pack;
a surface preparation aid for preparing a surface of the enclosure assembly for receiving the replacement service panel; and
an adhesive for affixing the replacement service panel to the surface.

2. The battery pack resealing kit as recited in claim 1, wherein the replacement service panel includes a groove that establishes a receptacle for receiving the adhesive.

3. The battery pack resealing kit as recited in claim 1, wherein the replacement service panel includes a first retention feature configured to engage a second retention feature of a bracket of the enclosure assembly.

4. The battery pack resealing kit as recited in claim 1, wherein the surface preparation aid is an abrasive cloth or pad.

5. The battery pack resealing kit as recited in claim 1, wherein the adhesive is a silicone based adhesive.

6. The battery pack resealing kit as recited in claim 1, wherein the adhesive is a non-silicone based adhesive.

7. The battery pack resealing kit as recited in claim 1, comprising a cleaning agent for cleaning the surface prior to preparing the surface with the surface preparation aide.

8. The battery pack resealing kit as recited in claim 7, wherein the cleaning agent includes an alcohol wipe.

9. The battery pack resealing kit as recited in claim 1, wherein the enclosure assembly of the battery pack includes a bracket that circumscribes the access opening.

10. The battery pack resealing kit as recited in claim 9, wherein the bracket is non-frangibly connected to the enclosure assembly.

11. The battery pack resealing kit as recited in claim 10, wherein the surface preparation aid is configured for preparing the bracket for receiving the replacement service panel.

12. The battery pack resealing kit as recited in claim 1, wherein the access opening is revealed after removal of a tear-away service panel from the enclosure assembly.

13. The battery pack resealing kit as recited in claim 12, wherein the tear-away service panel is circumscribed by a bracket prior to removing the tear-away service panel from the enclosure assembly to expose the access opening.

14. The battery pack resealing kit as recited in claim 13, wherein the bracket is configured to receive the replacement service panel after removing the tear-away service panel.

15. The battery pack resealing kit as recited in claim 14, wherein the tear-away service panel is constructed of a first polymer-based material and the bracket is constructed of a second polymer-based material that is different from the first polymer-based material.

16. The battery pack resealing kit as recited in claim 15, wherein the second polymer-based material includes a greater rigidity than the first polymer-based material.

17. The battery pack resealing kit as recited in claim 1, wherein the replacement service panel includes a tear strip configured to tear along a groove to remove the replacement service panel from the enclosure assembly.

18. A battery pack resealing kit, comprising:
a replacement service panel for covering an access opening formed in an enclosure assembly of a battery pack,
wherein the enclosure assembly includes a bracket that is non-frangibly connected to the enclosure assembly and arranged to circumscribe the access opening;
a surface preparation aid for preparing a surface of the bracket for receiving the replacement service panel; and
a curable adhesive for affixing the replacement service panel to the surface of the bracket,
wherein the bracket includes a groove that establishes a receptacle for receiving the curable adhesive.

* * * * *